US010643573B2

(12) United States Patent
Chaudhari et al.

(10) Patent No.: US 10,643,573 B2
(45) Date of Patent: May 5, 2020

(54) TECHNOLOGIES FOR END-TO-END DISPLAY INTEGRITY VERIFICATION FOR FUNCTIONAL SAFETY

(71) Applicant: Intel Corporation, Santa Clara, CA (US)

(72) Inventors: Prashant D. Chaudhari, Folsom, CA (US); Michael N. Derr, El Dorado, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/139,188

(22) Filed: Sep. 24, 2018

(65) Prior Publication Data

US 2019/0051266 A1 Feb. 14, 2019

(51) Int. Cl.

| | |
|---|---|
| ***G09G 5/00*** | (2006.01) |
| ***G06K 9/62*** | (2006.01) |
| ***G09G 5/39*** | (2006.01) |
| ***G09G 5/36*** | (2006.01) |
| ***G09G 5/393*** | (2006.01) |

(52) U.S. Cl.

CPC ........... *G09G 5/006* (2013.01); *G06K 9/6202* (2013.01); *G09G 5/003* (2013.01); *G09G 5/363* (2013.01); *G09G 5/39* (2013.01); *G09G 5/393* (2013.01); *G09G 2330/12* (2013.01); *G09G 2360/18* (2013.01); *G09G 2370/12* (2013.01); *G09G 2380/10* (2013.01)

(58) Field of Classification Search

CPC ........ G09G 5/006; G09G 5/003; G09G 5/363; G09G 5/39; G09G 5/393; G09G 2330/12; G09G 2360/18

See application file for complete search history.

(56) References Cited

U.S. PATENT DOCUMENTS

| | | | | |
|---|---|---|---|---|
| 7,113,880 B1 * | 9/2006 | Rhea | G09G 3/006 | 345/419 |
| 10,304,409 B2 * | 5/2019 | You | G09G 5/003 | |
| 2013/0106872 A1 * | 5/2013 | Peng | G09G 3/20 | 345/519 |

* cited by examiner

*Primary Examiner* — Ryan R Yang

(74) *Attorney, Agent, or Firm* — Barnes & Thornburg LLP

(57) ABSTRACT

Technologies for end-to-end display integrity verification include a computing device with a display controller coupled to a display by a physical link. The computing device generates pixel data in a data buffer in memory, and the display controller outputs a pixel signal on the physical link based on the pixel data using a physical interface. The display receives the pixel signal and displays a corresponding image. A splicer is connected to the physical link and repeats the pixel signal to an I/O port of the computing device. The I/O port may be a USB Type-C port. The computing device compares pixel data received by the I/O port to the pixel data in the data buffer. The computing device may calculate checksums of the pixel data. If the pixel data does not match, the computing device may indicate a display integrity failure. Other embodiments are described and claimed.

25 Claims, 4 Drawing Sheets

TECHNOLOGIES FOR END-TO-END DISPLAY INTEGRITY VERIFICATION FOR FUNCTIONAL SAFETY

BACKGROUND

Functional safety is a part of the overall safety of a system or piece of equipment that depends on the system or equipment operating correctly in response to its inputs. For computing devices, functional safety may include verifying that graphical user interfaces or other images displayed on a display screen match the images output or otherwise intended by the computing device. Current systems typically verify display images by capturing display pixels from an intermediate stage of display processing, before the image data has been output on a physical layer such as wires, connectors, analog circuitry, or other board-level components of the system. For example, pixel data may be captured in memory or otherwise captured during digital processing by sampling frames or regions of pixels in a frame buffer, or by using Wireless Display (WiDi) technology, Miracast™, or keyboard video mouse redirection (KVMR).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
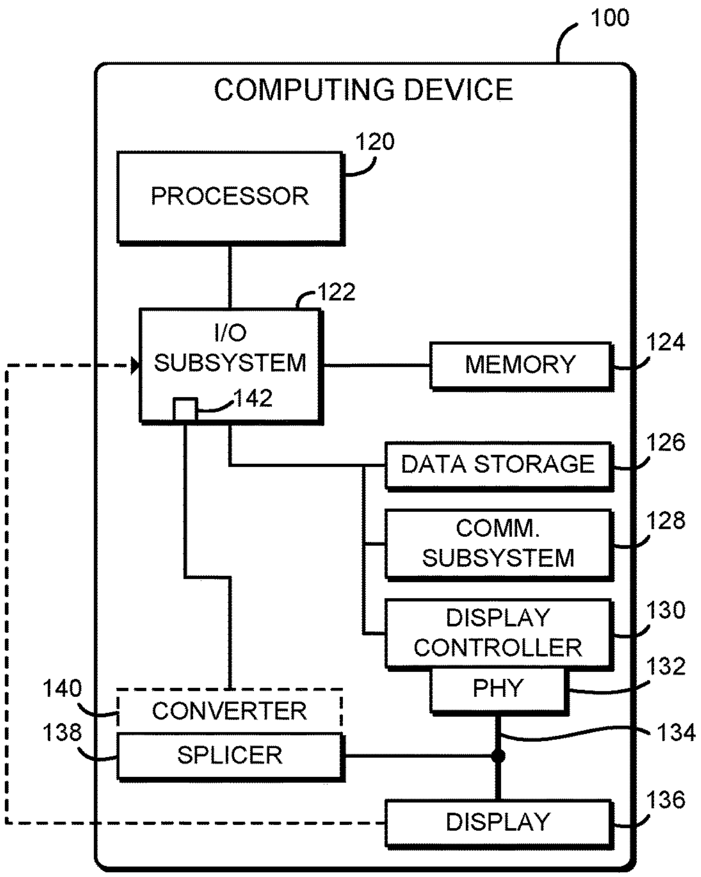
FIG. 1 is a simplified block diagram of at least one embodiment of a computing device for end-to-end display integrity verification.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for end-to-end display integrity verification includes a processor 120, a display controller 130, and a display 136. In use, as described further below, the computing device 100 generates graphical pixel data that is output for display by the display controller 130. The display controller 130 uses a physical interface to output pixel data signals over a physical link to the display 136. A splicer or other appropriate device is coupled to the physical link and transmits the pixel data signals back to an I/O port of the computing device 100, other than the physical interface of the display controller 130. Additionally or alternatively, in some embodiments the display 136 may have a separate feedback link to the I/O port of the computing device, and the display 136 may transmit pixel data signals back to the I/O port via the feedback link. The computing device 100 compares the pixel data received by the I/O port to the pixel data output for display by the display controller 130 and identifies any pixel data integrity failures. Thus, the computing device 100 may verify that the pixel data received by the display 136 on the physical link (and thus the image displayed by the display 136) matches the pixel data intended for output. Accordingly, by verifying end-to-end pixel data integrity including wires, connectors, analog circuitry and other board-level components, the computing device 100 may reduce functional safety risk as compared to traditional systems that sample image data in the display engine pipeline but are incapable of verifying image data after it is output by the physical interface. Accordingly, the computing device 100 may provide improved functional safety for autonomous driving, industrial applications, robotics, and other safety-critical applications.

The computing device 100 may be embodied as any type of computation or computer device capable of performing the functions described herein, including, without limitation, a computer, a server, a vehicle, an autonomous vehicle, an in-vehicle infotainment device, a rack-based server, a blade server, an industrial robot, an industrial robot controller, a workstation, a desktop computer, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively include the processor 120, an input/output subsystem 122, a memory 124, a data storage device 126, and a communication subsystem 128, and/or other components and devices commonly found in a server or similar computing device. Of course, the computing device 100 may include other or additional components, such as those commonly found in an autonomous vehicle (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100, such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the computing device 100 may be embodied as any network interface controller or other communication circuit, device, or collection thereof, capable of enabling communications between the computing device 100 and other remote devices over a network. The communication subsystem 128 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 further includes a display controller 130 and a display 136. The display controller 130 may be embodied as any card, controller circuit, IP core, functional block, or other component capable of receiving image frame data or other pixel data from the memory 124 or other components and outputting display signals to the display 136. For example, the display controller 130 may receive pixel data generated by a processor graphics of the processor 120, a graphics processing unit (GPU), or other circuit or collection of circuits capable of rendering two-dimensional and/or three-dimensional graphics. As described above, the display controller 130, along with the GPU and/or other graphics rendering components and/or media processing components, may be integrated with the processor 120 or otherwise form a portion of an SoC.

As shown, the display controller 130 communicates with the display 136 using a physical interface 132 and a physical link 134. The physical interface 132 may be embodied as one or more integrated circuits, chips, transceivers, analog circuits, physical connectors, or other physical interface components. The physical interface 132 is illustratively a USB Type-C™ interface specified by the USB Implementers Forum, Inc., although in other embodiments the physical interface 132 may be any other appropriate display interface and/or display protocol, such as a high-definition multimedia interface (HDMI) interface specified by the HDMI Forum, a DisplayPort™ interface specified by VESA, a display serial interface (DSI) specified by the MIPI® Alliance, or a mobile high-definition link (MHL) interface specified by the MHL Consortium. The physical link 134 may be embodied as one or more wires, circuit traces, serial data communication lanes, or other physical communication links as well as associated components, such as connectors, printed circuit board (PCB) components, and other components.

The illustrative computing device 100 further includes a splicer 138 coupled to the physical link 134 and, in some embodiments, may further include a protocol converter 140. As shown, the splicer 138 and/or the converter 140 are connected to the I/O subsystem 122 by an I/O port 142. Note that the I/O port 142 is a different port from the physical interface 132 of the display controller 130. The splicer 138 may be embodied as any splicer, active repeater, hub, or other circuitry or components that receives signals over the physical link 134 and transmits those signals back to the I/O port 142 of the I/O subsystem 122. Illustratively, the physical link 134 is a USB Type-C link, and the I/O port 142 is a USB Type-C port. Thus, in the illustrative embodiment, electrical signals may be repeated directly to the I/O port 142 without any protocol conversion or other conversions. As described above, in some embodiments, the physical link 134 may be embodied as a link for a different display protocol, such as HDMI, DisplayPort, DSI, or MHL. In those embodiments, the protocol converter 140 may convert the signals carried on the physical link 134 into signals appropriate for the I/O port 142, such as USB Type-C display protocol signals.

The display 136 of the computing device 100 may be embodied as any type of display capable of displaying digital information, such as a liquid crystal display (LCD), a light emitting diode (LED), a plasma display, a cathode ray tube (CRT), or other type of display device. The display 136 displays images in response to receiving image frame data or other pixel data over the physical link 134. In some embodiments, the display 136 may be coupled to the I/O subsystem 122 with a feedback link to any high-speed or low-speed data receiver port of the I/O subsystem 122 (e.g., a USB Type-C port or other I/O port). Additionally or alternatively, although the computing device 100 is illustrated as including the display 136, it should be understood that in some embodiments the computing device 100 may be connected to one or more external displays 136. In those embodiments, the physical link 134 may include one or more external display connectors, wires, or other components.

The computing device 100 may also include one or more peripheral devices (not shown). The peripheral devices may include any number of additional input/output devices, interface devices, and/or other peripheral devices. For example, in some embodiments, the peripheral devices may include a touch screen, graphics circuitry, keyboard, mouse, speaker system, microphone, network interface, and/or other input/output devices, interface devices, and/or peripheral devices.

Figure 2:
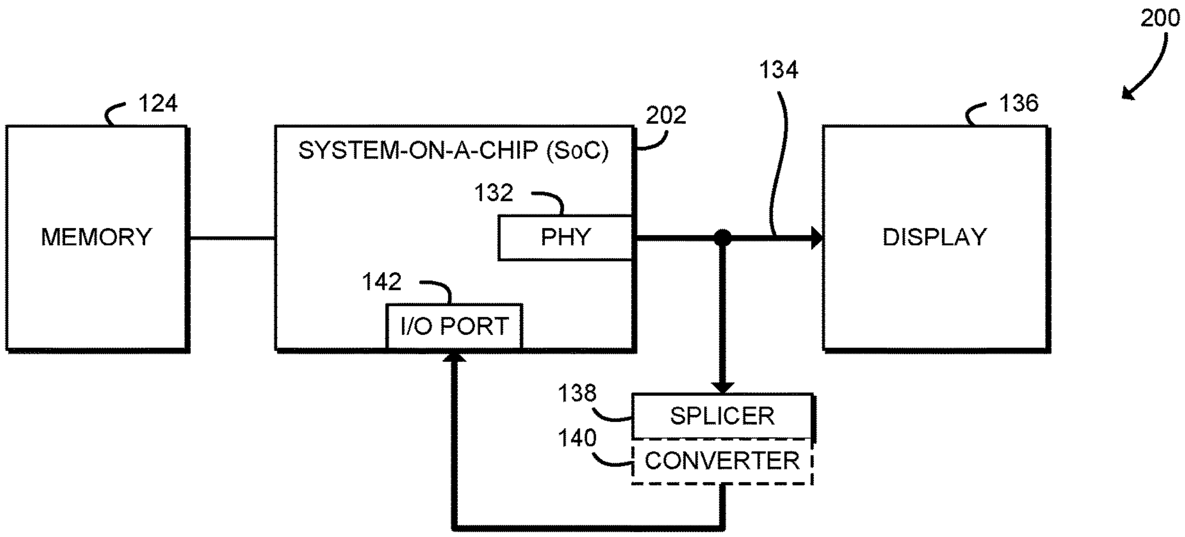
FIG. 2 is a simplified block diagram of at least one embodiment of various components of the computing device of FIG. 1.

Referring now to FIG. 2, diagram 200 illustrates various components of at least one potential embodiment the computing device 100. As shown, the memory 124 is coupled to a system-on-a-chip (SoC) 202. As described above, the SoC 202 may be embodied as a single integrated circuit that includes the processor 120, the I/O subsystem 122, and/or other components of the computing device 100. Illustratively, the SoC 202 includes the physical interface 132 and the I/O port 142. As shown, the physical interface 132 of the SoC 202 is coupled to the display 136 via the physical link 134. The splicer 138 is coupled to the physical link 134 and the I/O port 142. In some embodiments, a converter 140 may be coupled between the splicer 138 and the I/O port 142.

Figure 3:
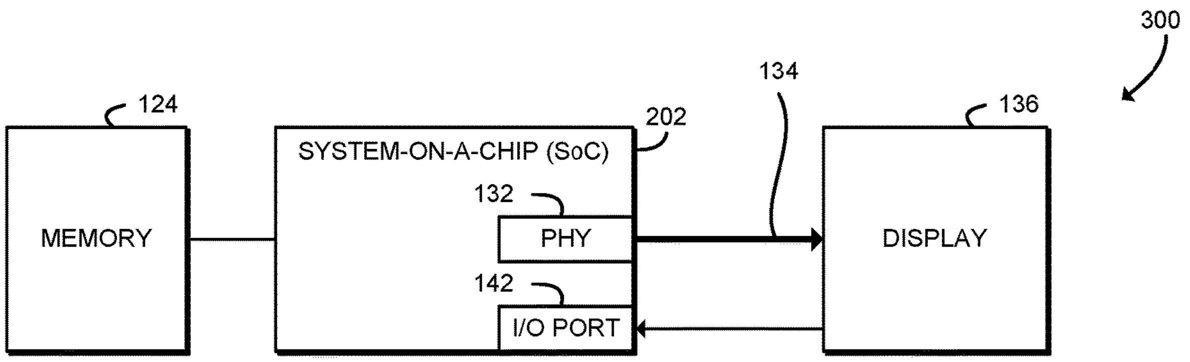
FIG. 3 is a simplified block diagram of at least one embodiment of various components of the computing device of FIG. 1.

Referring now to FIG. 3, diagram 300 illustrates various components of another potential embodiment the computing device 100. As shown, the memory 124 is coupled to the SoC 202, which includes the physical interface 132 and the I/O port 142. The physical interface 132 of the SoC 202 is coupled to the display 136 via the physical link 134. In the embodiment shown in FIG. 3, the display 136 is coupled to the I/O port 142 directly via a feedback link, without including a splicer 138 or converter 140.

Figure 4:
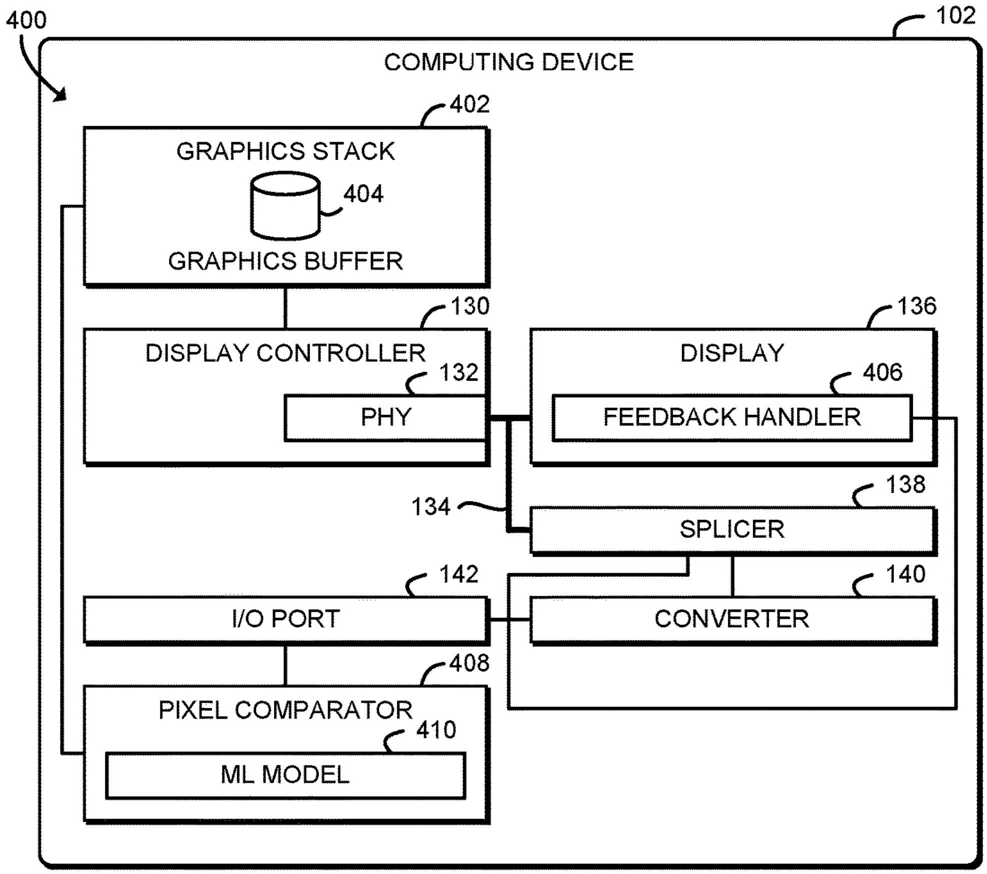
FIG. 4 is a simplified block diagram of at least one embodiment of an environment that may be established by the computing device of FIGS. 1-3.

Referring now to FIG. 4, in an illustrative embodiment, the computing device 100 establishes an environment 400 during operation. The illustrative environment 400 includes a graphics stack 402, the display controller 130, the display 136, the splicer 138, the converter 140, the I/O port 142, and a pixel comparator 408. The various components of the environment 400 may be embodied as hardware, firmware, software, or a combination thereof. As such, in some embodiments, one or more of the components of the environment 400 may be embodied as circuitry or collection of electrical devices (e.g., graphics stack circuitry 402, display controller circuitry 130, display circuitry 136, splicer circuitry 138, converter circuitry 140, I/O port circuitry 142, and/or pixel comparator circuitry 408). It should be appreciated that, in such embodiments, one or more of the graphics stack circuitry 402, the display controller circuitry 130, the display circuitry 136, the splicer circuitry 138, the converter circuitry 140, the I/O port circuitry 142, and/or the pixel comparator circuitry 408 may form a portion of one or more of the processor 120, the I/O subsystem 122, the display controller 130, the display 136, and/or other components of the computing device 100. Additionally, in some embodiments, one or more of the illustrative components may form a portion of another component and/or one or more of the illustrative components may be independent of one another.

The graphics stack 402 may be embodied as one or more applications, graphics libraries, graphics drivers, operating systems, and other display processing components of the computing device 100. The graphics stack 402 is configured to generate pixel data indicative of an image, such as a graphical user interface. The pixel data is stored in a graphics buffer 404, which may be located in the memory 124. The graphics stack 402 may be further configured to transfer the pixel data from the memory 124 to the display controller 130.

The display controller 130 is configured to output, by the physical interface 132, a pixel signal on the physical link 134 in response to the pixel data being generated. The pixel signal is based on the pixel data in the graphics buffer 404. The display 136 is configured to receive pixel data via the physical link 134 and display an image corresponding to the received pixel data.

The splicer 138 is configured to receive the pixel signal via the physical link 134 and repeat that pixel signal in response to receiving the first pixel signal. In some embodiments, the converter 140 may be configured to convert the pixel signal from a display protocol signal to an I/O protocol of the I/O port 142. The I/O port 142 is configured to receive the pixel signal from the splicer 138.

The pixel comparator 408 is configured to determine received pixel data based on the pixel signal received by the I/O port 142. The pixel comparator 408 is further configured to compare the pixel data of the graphics buffer 404 to the received pixel data. The pixel comparator 408 may be configured to determine whether the pixel data of the graphics buffer 404 is correlated with the received pixel data and if not, indicate a display integrity failure. Comparing the pixel data may include performing a pixel-by-pixel comparison of the pixel data of the graphics buffer 404 and the received pixel data. In some embodiments, comparing the pixel data may include calculating checksums of each pixel data comparing the checksums. In still other embodiments, comparing the pixel data may include inferring an expected image based on the pixel data of the graphics buffer 404 using a machine learning (ML) model 410 and comparing the expected image to the received pixel data. The ML model 410 may be embodied as an artificial neural network, convolutional neural network, recurrent neural network, or other machine learning model.

As shown in FIG. 4, in some embodiments the display 136 may include a feedback handler 406. In those embodiments, the feedback handler 406 is to transmit pixel data received by the display 136 to the I/O port 142 in response to the display 136 displaying the image. In those embodiments, the I/O port 142 is configured to receive the pixel data from the display 136. In some embodiments, the feedback handler 406 may be further configured to calculate a checksum of the pixel data in response to displaying the image and to transmit the checksum to the I/O port 142.

Figure 5:
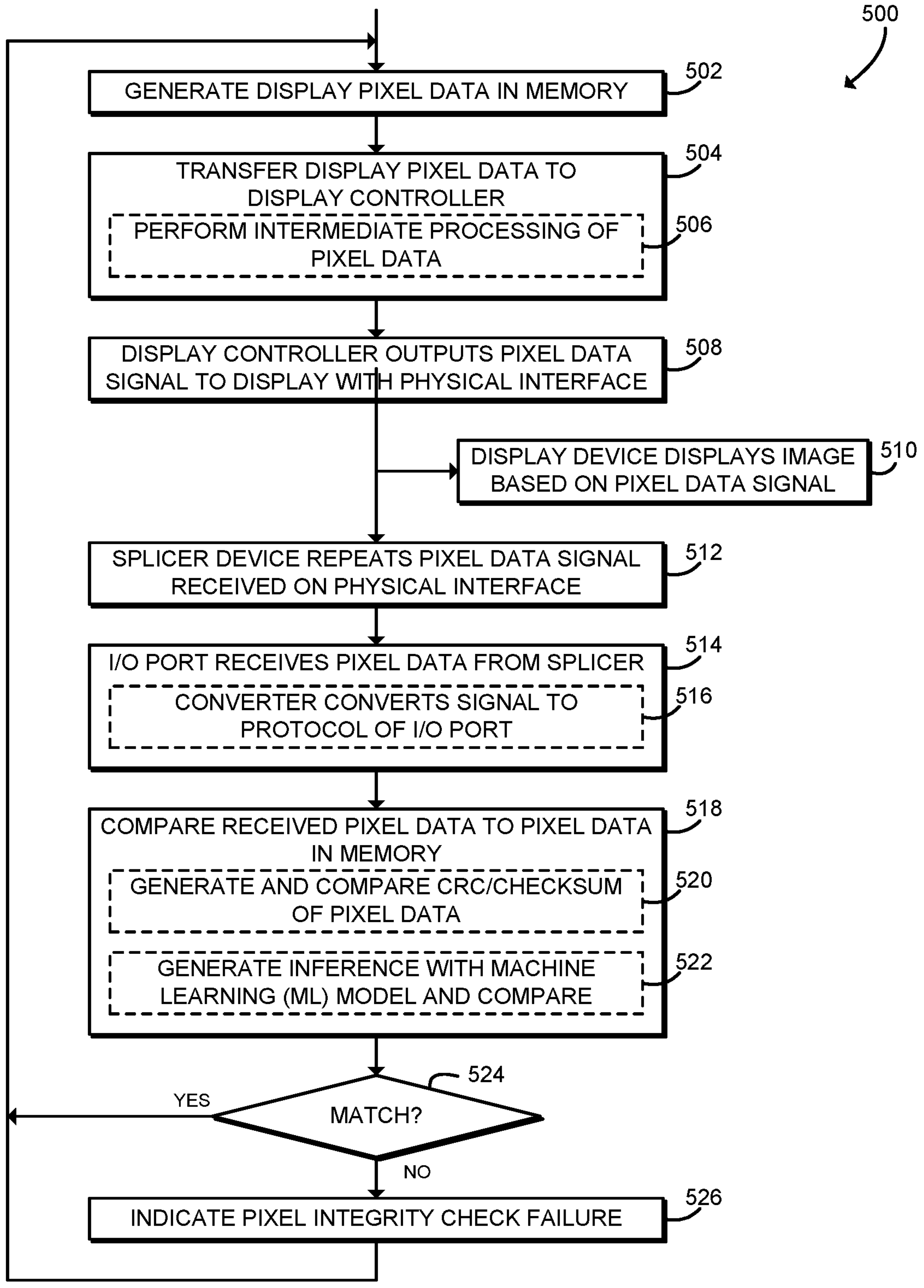
FIG. 5 is a simplified flow diagram of at least one embodiment of a method for end-to-end display integrity verification that may be performed by the computing device of FIGS. 1-4.

Referring now to FIG. 5, in use, the computing device 100 may execute a method 500 for end-to-end display integrity verification. In some embodiments, the method 500 may be performed by an embodiment of the computing device 100 as illustrated in FIG. 2. Further, it should be appreciated that, in some embodiments, the operations of the method 500 may be performed by one or more components of the environment 400 of the computing device 100 as shown in FIG. 4. The method 500 begins in block 502, in which the computing device 100 generates pixel data for display in the graphics buffer 404 in the memory 124. The pixel data may be embodied as an image frame, video data, or other graphical data to be displayed on the display 136. For example, the pixel data may include user interface graphics. The pixel data may be generated by a user application, a graphics framework, a graphics driver, or any other display processing component of the computing device 100. In some embodiments, the pixel data may be embodied as user interface data or other data generated by a functional-safety-critical application such as an autonomous or semi-autonomous driving application, an industrial or robotics application, or other functional-safety-critical application.

In block 504, the computing device 100 transfers the display pixel data to the display controller 130. For example, the computing device 100 may transfer the display pixel data using one or more direct memory access (DMA) operations or other operations to provide the data to the display controller 130. In some embodiments, the pixel data may be transferred internally within the processor 120, the I/O subsystem 122, an SoC 202, or other component of the computing device 100. In some embodiments, in block 506 the computing device 100 may perform one or more intermediate processing stages on the pixel data. For example, the computing device 100 may perform gamma correction, color correction, blending, or other processing on the pixel data. The processing may be performed by the computing device 100 before or after the pixel data is transferred to the display controller 130, and in some embodiments modifications to the pixel data generated by processing may be saved back to the memory 124.

In block 508, the display controller 130 of the computing device 100 outputs a pixel data signal based on the pixel data with the physical interface 132. The physical interface 132 may generate one or more analog and/or digital signals on the physical link 134 that correspond to the pixel data. As described above, the physical interface 132 illustratively generates USB Type-C display protocol signals on the physical link 134. Additionally or alternatively, in some embodiments the physical interface 132 may generate HDMI protocol signals, DisplayPort protocol signals, DSI protocol signal, MHL protocol signals, or other display protocol signals. As described above, the pixel data signal is transmitted over the physical link 134 to the display 136 and the splicer 138. Accordingly, the method 500 advances to both blocks 510, 512.

In block 510, the display 136 displays an image based on the pixel data signal received over the physical link 134. The image displayed by the display 136 is usually the same image represented by the pixel data in the graphics buffer 404, such as a user interface or other graphical image. However, in certain circumstances the pixel data signal received by the display 136 may not match or otherwise not be correlated with the pixel data in the graphics buffer 404, for example as a result of signal loss, environmental conditions (e.g., temperature, shock, vibration, radiation, humidity, voltage, etc.), hardware failure, software failure (e.g., bugs or security vulnerabilities), interference, physical tampering, or other causes. The image displayed by the display 136 may be viewed or otherwise consumed by a user of the computing device 100.

As described above, after outputting the pixel data signal in block 508, the method 500 also advances to block 512, in which the splicer 138 receives the pixel data signal on the physical link 134 and repeats that received pixel data signal to the I/O port 142. Illustratively, the splicer 138 receives a USB Type-C signal on the physical link 134 and repeats that USB Type-C signal to the I/O port 142. Thus, the signal repeated to the I/O port 142 matches the signal received by the display 136. Accordingly, the image represented by the signal sent to the I/O port 142 matches the image that is displayed by the display 136, including any changes to the pixel data signal caused by signal loss, environmental conditions, hardware failure, software failure, interference, physical tampering, or other causes as described above.

In block 514, the I/O port 142 receives pixel data from the splicer 138. The I/O port 142 may deserialize or otherwise format received pixel data signals into binary pixel data. The binary pixel data may be stored in the memory 124 (e.g., using one or more DMA operations) or otherwise provided to the processor 120 for further processing. As described above, in the illustrative embodiment, the I/O port 142 is a USB Type-C port that receives USB Type-C display protocol signals from the splicer 138. In some embodiments, in block 516, the converter 140 may convert the pixel data signal repeated by the splicer 138 into an appropriate protocol for the I/O port 142. For example, in some embodiments, the converter 140 may convert a pixel data signal in a display protocol format such as HDMI, DisplayPort, DSI, MHL, or other display protocol into a USB Type-C signal or other high-speed I/O protocol signal.

In block 518, the computing device 100 compares the received pixel data from the I/O port 142 to the pixel data of the graphics buffer 404 in the memory 124. The computing device 100 may use any appropriate technique to determine whether the received pixel data, which represents the image actually displayed by the display 136, matches the image of the graphics buffer 404, which represents the image intended for display by the user application or other graphics component of the computing device 100. For example, the computing device 100 may perform a pixel-by-pixel comparison of an image frame or part of an image frame from both the received pixel data and the graphics buffer 404. In some embodiments, the computing device 100 may perform the comparison against a copy of an image frame from the graphics buffer 404, for example to account for timing variations between the received pixel data and the graphics buffer 404. In some embodiments, in block 520 the computing device 100 may generate a checksum, cyclic redundancy check (CRC), or other error-correcting code (ECC) for each of the pixel data in the graphics buffer 404 and the pixel data received via the I/O port 142. In those embodiments, the computing device 100 may compare the checksums or other ECC instead of comparing the pixel data.

In some embodiments, in block 522, the computing device 100 may generate an inference with the machine learning (ML) model 410 based on the pixel data of the graphics buffer 404 and compare the inference to the received pixel data (or vice versa). In some embodiments, the pixel data output by the physical interface 132 over the physical link 134 may not exactly match the contents of the pixel data stored in the graphics buffer 404. For example, the display controller 130 or other components of the computing device 100 may perform gamma correction, color correction, blending, or other processing on the pixel data before it is transmitted by the physical interface 132. In those embodiments, the ML model 410 may generate an inference to approximate the effects of image processing or other expected changes to the pixel data. Additionally or alternatively, in some embodiments, instead of using the ML model 410, the computing device 100 may simulate, physically model, or otherwise model any image processing or other expected changes to the pixel data.

In block 524, the computing device 100 determines whether the pixel data received over the I/O port 142 matches the pixel data stored in the graphics buffer 404. If so, the method 500 loops back to block 502 to continue outputting and verifying pixel data. The computing device 100 thus may be assured of end-to-end display integrity, which may improve functional safety. Referring back to block 524, if the pixel data received over the I/O port 142 does not match the pixel data stored in the graphics buffer 404, the method 500 advances to block 526.

In block 526, the computing device 100 indicates a pixel data integrity check failure. The pixel data integrity check failure may indicate that the image displayed by the display 136 does not match the image intended by a user application or other graphics component of the computing device 100, which may be a functional safety problem. Accordingly, the computing device 100 may alert a user, log an error, assert one or more signals, or otherwise indicate the pixel data integrity check failure. The computing device 100 may also take one or more remedial actions in response to the pixel data integrity check failure, such as halting the computing device 100, restarting the computing device 100, halting or restarting one or more applications, operating systems, or other software components of the computing device 100, entering a failsafe operating mode, or performing any other appropriate remedial action. After indicating the pixel data integrity check, the method 500 may loop back to block 502 to continue outputting and verifying pixel data.

Figure 6:
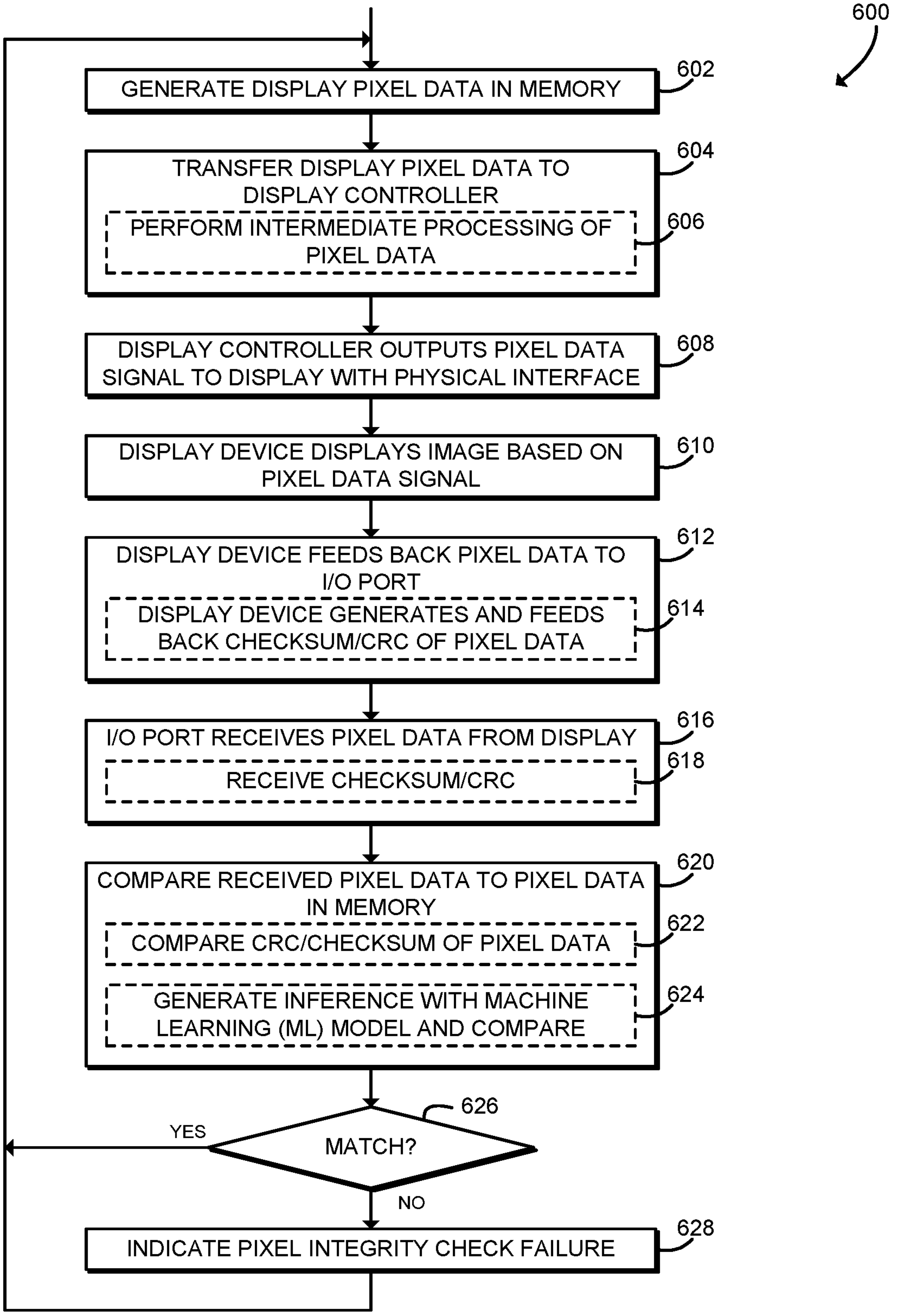
FIG. 6 is a simplified flow diagram of at least one embodiment of another method for end-to-end display integrity verification that may be performed by the computing device of FIGS. 1-4.

Referring now to FIG. 6, in use, the computing device 100 may execute a method 600 for end-to-end display integrity verification. In some embodiments, the method 600 may be performed by an embodiment of the computing device 100 as illustrated in FIG. 3. It should be appreciated that, in some embodiments, the operations of the method 600 may be performed by one or more components of the environment 400 of the computing device 100 as shown in FIG. 4. The method 600 begins in block 602, in which the computing device 100 generates pixel data for display in the graphics buffer 404 in the memory 124. As described above, the pixel data may be embodied as an image frame, video data, or other graphical data to be displayed on the display 136. For example, the pixel data may include user interface graphics. The pixel data may be generated by a user application, a graphics framework, a graphics driver, or any other display processing component of the computing device 100. In some embodiments, the pixel data may be embodied as user interface data or other data generated by a functional-safety-critical application such as an autonomous or semi-autonomous driving application, an industrial or robotics application, or other functional-safety-critical application.

In block 604, the computing device 100 transfers the display pixel data to the display controller 130. For example, as described above, the computing device 100 may transfer the display pixel data using one or more direct memory access (DMA) operations or other operations to provide the data to the display controller 130. In some embodiments, the pixel data may be transferred internally within the processor 120, the I/O subsystem 122, an SoC 202, or other component of the computing device 100. In some embodiments, in block 606 the computing device 100 may perform one or more intermediate processing stages on the pixel data. For example, the computing device 100 may perform gamma correction, color correction, blending, or other processing on the pixel data. The processing may be performed by the computing device 100 before or after the pixel data is transferred to the display controller 130, and in some embodiments modifications to the pixel data generated by processing may be saved back to the memory 124.

In block 608, the display controller 130 of the computing device 100 outputs a pixel data signal based on the pixel data with the physical interface 132. The physical interface 132 may generate one or more analog and/or digital signals on the physical link 134 that correspond to the pixel data. As described above, the physical interface 132 illustratively generates USB Type-C display protocol signals on the physical link 134. Additionally or alternatively, in some embodiments the physical interface 132 may generate HDMI protocol signals, DisplayPort protocol signals, DSI protocol signal, MHL protocol signals, or other display protocol signals.

In block 610, the display 136 displays an image based on the pixel data signal received over the physical link 134. As described above, the image displayed by the display 136 is usually the same image represented by the pixel data in the graphics buffer 404, such as a user interface or other graphical image. However, in certain circumstances the pixel data signal received by the display 136 may not match or otherwise not be correlated with the pixel data in the graphics buffer 404, for example as a result of signal loss, environmental conditions (e.g., temperature, shock, vibration, radiation, humidity, voltage, etc.), hardware failure, software failure (e.g., bugs or security vulnerabilities), interference, physical tampering, or other causes. The image displayed by the display 136 may be viewed or otherwise consumed by a user of the computing device 100.

In block 612, the display 136 feeds back pixel data to the I/O port 142 via a feedback link. The display 136 feeds back pixel data based on the image displayed by the display 136, which is in turn based on the pixel data signal received over the physical link 134. Accordingly, the pixel data provided by the display 136 to the I/O port 142 matches the image displayed by the display 136, including any changes to the pixel data signal caused by signal loss, environmental conditions, hardware failure, software failure, interference, physical tampering, or other causes as described above. The display 136 may transmit display protocol data to the I/O port 142, such as USB Type-C display protocol data, HDMI data, DisplayPort data, DSI data, MHL data, or other display protocol data. In some embodiments, in block 614, the display 136 may generate a checksum, cyclic redundancy check (CRC), or other error-correcting code (ECC) for the pixel data and provide that checksum or other data to the I/O port 142. Transmitting a checksum or other ECC may reduce required bandwidth as compared to transmitting display protocol data. Thus, in those embodiments the I/O port 142 may be embodied as a low-speed I/O port.

In block 616, the I/O port 142 receives pixel data from the display 136. As described above, the I/O port 142 may deserialize or otherwise format received pixel data signals into binary pixel data. The binary pixel data may be stored in the memory 124 (e.g., using one or more DMA operations) or otherwise provided to the processor 120 for further processing. As described above, in the illustrative embodiment, the I/O port 142 is a USB Type-C port that receives USB Type-C display protocol signals from the display 136. In some embodiments, in block 618, the I/O port 142 may receive a checksum, CRC, or other error correcting code generated by the display 136 instead of full display protocol data. As described above, in those embodiments the I/O port 142 may be a low-speed I/O port.

In block 620, the computing device 100 compares the received pixel data from the I/O port 142 to the pixel data of the graphics buffer 404 in the memory 124. As described above, the computing device 100 may use any appropriate technique to determine whether the received pixel data, which represents the image actually displayed by the display 136, matches the image of the graphics buffer 404, which represents the image intended for display by the user application or other graphics component of the computing device 100. For example, the computing device 100 may perform a pixel-by-pixel comparison of an image frame or part of an image frame from both the received pixel data and the graphics buffer 404. In some embodiments, the computing device 100 may perform the comparison against a copy of an image frame from the graphics buffer 404, for example to account for timing variations between the received pixel data and the graphics buffer 404. In some embodiments, in block 622 the computing device 100 may generate a checksum, cyclic redundancy check (CRC), or other error-correcting code (ECC) for the pixel data in the graphics buffer 404 and compare that checksum or other ECC to a checksum or other ECC received from the display 136.

In some embodiments, in block 624, the computing device 100 may generate an inference with the machine learning (ML) model 410 based on the pixel data of the graphics buffer 404 and compare the inference to the received pixel data (or vice versa). As described above, in some embodiments, the pixel data output by the physical interface 132 over the physical link 134 may not exactly match the contents of the pixel data stored in the graphics buffer 404. For example, the display controller 130 or other components of the computing device 100 may perform gamma correction, color correction, blending, or other processing on the pixel data before it is transmitted by the physical interface 132. In those embodiments, the ML model 410 may generate an inference to approximate the effects of image processing or other expected changes to the pixel data. Additionally or alternatively, in some embodiments, instead of using the ML model 410, the computing device 100 may simulate, physically model, or otherwise model any image processing or other expected changes to the pixel data.

In block 626, the computing device 100 determines whether the pixel data received over the I/O port 142 matches the pixel data stored in the graphics buffer 404. If so, the method 600 loops back to block 602 to continue outputting and verifying pixel data. The computing device 100 thus may be assured of end-to-end display integrity, which may improve functional safety. Referring back to block 626, if the pixel data received over the I/O port 142 does not match the pixel data stored in the graphics buffer 404, the method 600 advances to block 628.

In block 628, the computing device 100 indicates a pixel data integrity check failure. As described above, the pixel data integrity check failure may indicate that the image displayed by the display 136 does not match the image intended by a user application or other graphics component of the computing device 100, which may be a functional safety problem. Accordingly, the computing device 100 may alert a user, log an error, assert one or more signals, or otherwise indicate the pixel data integrity check failure. The computing device 100 may also take one or more remedial actions in response to the pixel data integrity check failure, such as halting the computing device 100, restarting the computing device 100, halting or restarting one or more applications, operating systems, or other software components of the computing device 100, entering a failsafe operating mode, or performing any other appropriate remedial action. After indicating the pixel data integrity check, the method 600 may loop back to block 602 to continue outputting and verifying pixel data.

It should be appreciated that, in some embodiments, the methods 500 and/or 600 may be embodied as various instructions stored on a computer-readable media, which may be executed by the processor 120, the I/O subsystem 122, and/or other components of the computing device 100 to cause the computing device 100 to perform the respective method 500 and/or 600. The computer-readable media may be embodied as any type of media capable of being read by the computing device 100 including, but not limited to, the memory 124, the data storage device 126, firmware devices, and/or other media.

EXAMPLES

Illustrative examples of the technologies disclosed herein are provided below. An embodiment of the technologies may include any one or more, and any combination of, the examples described below.

Example 1 includes a computing device for display integrity checking, the computing device comprising: a memory; a graphics stack to generate first pixel data indicative of an image, wherein the first pixel data is stored in a data buffer in the memory; a physical interface coupled to a display via a physical link, wherein the physical interface is to output a first pixel signal on the physical link in response to generation of the first pixel data, wherein the first pixel signal is based on the first pixel data; a splicer device coupled to the physical link; an I/O port coupled to the splicer device, wherein the I/O port is to receive a second pixel signal from the splicer device in response to an outputting of the first pixel signal; and a pixel comparator to (i) determine second pixel data based on the second pixel signal received by the I/O port and (ii) compare the first pixel data to the second pixel data in response to receipt of the second pixel signal.

Example 2 includes the subject matter of Example 1, and wherein the splicer device is to (i) receive the first pixel signal via the physical link and (ii) repeat the first pixel signal as the second pixel signal in response to receipt of the first pixel signal.

Example 3 includes the subject matter of any of Examples 1 and 2, and wherein the splicer device comprises a splicer, an active repeater, or a hub.

Example 4 includes the subject matter of any of Examples 1-3, and wherein the I/O port comprises a USB Type-C port, and wherein the second pixel signal comprises a USB display protocol signal.

Example 5 includes the subject matter of any of Examples 1-4, and further comprising a converter device coupled to the physical link, wherein the converter device is to convert the first pixel signal to the second pixel signal, wherein the first pixel signal comprises a display protocol signal and wherein the second pixel signal comprises an I/O protocol of the I/O port.

Example 6 includes the subject matter of any of Examples 1-5, and wherein the display protocol comprises an HDMI protocol, a DisplayPort protocol, a MIPI-DSI protocol, or an MHL protocol.

Example 7 includes the subject matter of any of Examples 1-6, and wherein to compare the first pixel data to the second pixel data comprises to: determine whether the first pixel data is correlated with the second pixel data; and indicate a display integrity failure in response to a determination that the first pixel data is not correlated with the second pixel data.

Example 8 includes the subject matter of any of Examples 1-7, and wherein to compare the first pixel data to the second pixel data comprises to perform a pixel-by-pixel comparison of the first pixel data and the second pixel data.

Example 9 includes the subject matter of any of Examples 1-8, and wherein to compare the first pixel data to the second pixel data comprises to: calculate a first checksum of the first pixel data and a second checksum of the second pixel data; and compare the first checksum to the second checksum.

Example 10 includes the subject matter of any of Examples 1-9, and wherein to compare the first pixel data to the second pixel data comprises to: infer an expected image based on the first pixel data using a machine learning model; and compare the expected image to an image of the second pixel data in response to an inference of the expected image.

Example 11 includes the subject matter of any of Examples 1-10, and further comprising a display controller coupled to the physical interface, wherein: the graphics stack is further to transfer the first pixel data from the memory to the display controller; and to output the first pixel signal comprises to output the first pixel signal in response to a transfer of the first pixel data.

Example 12 includes the subject matter of any of Examples 1-11, and wherein the display is to display the image corresponding to the first pixel data based on the first pixel signal in response to the outputting of the first pixel signal.

Example 13 includes a computing device for display integrity checking, the computing device comprising: a memory; a display; an I/O port coupled to the display; a pixel comparator; a graphics stack to generate first pixel data indicative of a first image, wherein the first pixel data is stored in a data buffer in a memory of the computing device; and a display controller coupled to the display via a physical link, wherein the display controller is to output the first pixel data to a display of the computing device via a physical link; wherein the display is to (i) receive the first pixel data via the physical link, (ii) display an image based on the first pixel data in response to receipt of the first pixel data, and (iii) transmit second pixel data to the I/O port in response to display of the image, wherein the second pixel data comprises the first pixel data received by the display; wherein the I/O port is to receive the second pixel data from the display; and wherein the pixel comparator is to compare the first pixel data to the second pixel data in response to receipt of the second pixel data.

Example 14 includes the subject matter of Example 13, and wherein: the pixel comparator is further to calculate a first checksum of the first pixel data; the display is further to calculate a second checksum of the second pixel data in response to displaying the second image; to transmit the second pixel data comprises to transmit the second checksum; and to compare the first pixel data to the second pixel data comprises to compare the first checksum to the second checksum.

Example 15 includes the subject matter of any of Examples 13 and 14, and wherein the I/O port comprises a USB Type-C port, and wherein the second pixel data comprises USB display protocol data.

Example 16 includes the subject matter of any of Examples 13-15, and wherein to compare the first pixel data to the second pixel data comprises to: determine whether the first pixel data is correlated with the second pixel data; and indicate a display integrity failure in response to a determination that the first pixel data is not correlated with the second pixel data.

Example 17 includes the subject matter of any of Examples 13-16, and wherein to compare the first pixel data to the second pixel data comprises to perform a pixel-by-pixel comparison of the first pixel data and the second pixel data.

Example 18 includes the subject matter of any of Examples 13-17, and wherein to compare the first pixel data to the second pixel data comprises to: calculate a first checksum of the first pixel data; calculate a second checksum of the second pixel data in response to receiving the second pixel data from the display; and compare the first checksum to the second checksum.

Example 19 includes the subject matter of any of Examples 13-18, and wherein to compare the first pixel data to the second pixel data comprises to: infer an expected image based on the first pixel data using a machine learning model; and compare the expected image to an image of the second pixel data in response to an inference of the expected image.

Example 20 includes the subject matter of any of Examples 13-19, and wherein: the graphics stack is further to transfer the first pixel data from the memory to the display controller; and to output the first pixel data comprises to output the first pixel data in response to a transfer of the first pixel data.

Example 21 includes a method for display integrity checking, the method comprising: generating, by a computing device, first pixel data indicative of an image, wherein the first pixel data is stored in a data buffer in a memory of the computing device; outputting, by the computing device, a first pixel signal from a physical interface of the computing device in response to generating the first pixel data, wherein the first pixel signal is based on the first pixel data, and wherein the physical interface is coupled to a display of the computing device via a physical link; receiving, by an I/O port of the computing device, a second pixel signal from a splicer device of the computing device in response to outputting the first pixel signal, wherein the splicer device is coupled to the physical link; determining, by the computing device, second pixel data based on the second pixel signal received by the I/O port; and comparing, by the computing device, the first pixel data to the second pixel data in response to receiving the second pixel signal.

Example 22 includes the subject matter of Example 21, and wherein receiving the second pixel signal comprises: receiving, by the splicer device, the first pixel signal via the physical link; and repeating, by the splicer device, the first pixel signal as the second pixel signal in response to receiving the first pixel signal.

Example 23 includes the subject matter of any of Examples 21 and 22, and wherein the splicer device comprises a splicer, an active repeater, or a hub.

Example 24 includes the subject matter of any of Examples 21-23, and wherein receiving the second pixel signal comprises receiving, by a USB Type-C port of the computing device, the second pixel signal, wherein the second pixel signal comprises a USB display protocol signal.

Example 25 includes the subject matter of any of Examples 21-24, and wherein receiving the second pixel signal comprises converting, by a converter device of the computing device, the first pixel signal to the second pixel signal, wherein the first pixel signal comprises a display protocol signal and wherein the second pixel signal comprises an I/O protocol of the I/O port.

Example 26 includes the subject matter of any of Examples 21-25, and wherein the display protocol comprises an HDMI protocol, a DisplayPort protocol, a MIPI-DSI protocol, or an MHL protocol.

Example 27 includes the subject matter of any of Examples 21-26, and wherein comparing the first pixel data to the second pixel data comprises: determining whether the first pixel data is correlated with the second pixel data; and indicating a display integrity failure in response to determining that the first pixel data is not correlated with the second pixel data.

Example 28 includes the subject matter of any of Examples 21-27, and wherein comparing the first pixel data to the second pixel data comprises performing a pixel-by-pixel comparison of the first pixel data and the second pixel data.

Example 29 includes the subject matter of any of Examples 21-28, and wherein comparing the first pixel data to the second pixel data comprises: calculating a first checksum of the first pixel data and a second checksum of the second pixel data; and comparing the first checksum to the second checksum.

Example 30 includes the subject matter of any of Examples 21-29, and wherein comparing the first pixel data to the second pixel data comprises: inferring an expected image based on the first pixel data using a machine learning model; and comparing the expected image to an image of the second pixel data in response to inferring the expected image.

Example 31 includes the subject matter of any of Examples 21-30, and further comprising: transferring, by the computing device, the first pixel data from the memory to a display controller of the computing device; wherein outputting the first pixel signal comprises outputting the first pixel signal in response to transferring the first pixel data.

Example 32 includes the subject matter of any of Examples 21-31, and further comprising displaying, by the display, the image corresponding to the first pixel data based on the first pixel signal in response to outputting the first pixel signal.

Example 33 includes a method for display integrity checking, the method comprising: generating, by a computing device, first pixel data indicative of a first image, wherein the first pixel data is stored in a data buffer in a memory of the computing device; outputting, by the computing device, the first pixel data to a display of the computing device via a physical link; receiving, by the display, the first pixel data via the physical link; displaying, by the display, a second image based on the first pixel data in response to receiving the first pixel data; transmitting, by the display, second pixel data to an I/O port of the computing device in response to displaying the second image, wherein the second pixel data comprises the first pixel data received by the display; receiving, by the I/O port, the second pixel data from the display; and comparing, by the computing device, the first pixel data to the second pixel data in response to receiving the second pixel data.

Example 34 includes the subject matter of Examples 33, and further comprising: calculating, by the computing device, a first checksum of the first pixel data; and calculating, by the display, a second checksum of the second pixel data in response to displaying the second image; wherein transmitting the second pixel data comprises transmitting the second checksum; and wherein comparing the first pixel data to the second pixel data comprises comparing the first checksum to the second checksum.

Example 35 includes the subject matter of any of Examples 33 and 34, and wherein receiving the second pixel data comprises receiving, by a USB Type-C port of the computing device, the second pixel data, wherein the second pixel data comprises USB display protocol data.

Example 36 includes the subject matter of any of Examples 33-35, and wherein comparing the first pixel data to the second pixel data comprises: determining whether the first pixel data is correlated with the second pixel data; and indicating a display integrity failure in response to determining that the first pixel data is not correlated with the second pixel data.

Example 37 includes the subject matter of any of Examples 33-36, and wherein comparing the first pixel data to the second pixel data comprises performing a pixel-by-pixel comparison of the first pixel data and the second pixel data.

Example 38 includes the subject matter of any of Examples 33-37, and wherein comparing the first pixel data to the second pixel data comprises: calculating a first checksum of the first pixel data; calculating a second checksum of the second pixel data in response to receiving the second pixel data from the display; and comparing the first checksum to the second checksum.

Example 39 includes the subject matter of any of Examples 33-38, and wherein comparing the first pixel data to the second pixel data comprises: inferring an expected image based on the first pixel data using a machine learning model; and comparing the expected image to an image of the second pixel data in response to inferring the expected image.

Example 40 includes the subject matter of any of Examples 33-39, and further comprising: transferring, by the computing device, the first pixel data from the memory to a display controller of the computing device; wherein outputting the first pixel data comprises outputting the first pixel data in response to transferring the first pixel data.

Example 41 includes a computing device comprising: a processor; and a memory having stored therein a plurality of instructions that when executed by the processor cause the computing device to perform the method of any of Examples 21-40.

Example 42 includes one or more non-transitory, computer readable storage media comprising a plurality of instructions stored thereon that in response to being executed result in a computing device performing the method of any of Examples 21-40.

Example 43 includes a computing device comprising means for performing the method of any of Examples 21-40.

The invention claimed is:

1. A computing device for display integrity checking, the computing device comprising:

a memory;

a graphics stack to generate first pixel data indicative of an image, wherein the first pixel data is stored in a data buffer in the memory;

a physical interface coupled to a display via a physical link, wherein the physical interface is to output a first pixel signal on the physical link in response to generation of the first pixel data, wherein the first pixel signal is based on the first pixel data;

a splicer device coupled to the physical link;

an I/O port coupled to the splicer device, wherein the I/O port is to receive a second pixel signal from the splicer device in response to an outputting of the first pixel signal; and a pixel comparator to (i) determine second pixel data based on the second pixel signal received by the I/O port and (ii) compare the first pixel data to the second pixel data in response to receipt of the second pixel signal.

2. The computing device of claim 1, wherein the splicer device is to (i) receive the first pixel signal via the physical link and (ii) repeat the first pixel signal as the second pixel signal in response to receipt of the first pixel signal.

3. The computing device of claim 1, wherein the splicer device comprises a splicer, an active repeater, or a hub.

4. The computing device of claim 1, wherein the I/O port comprises a USB Type-C port, and wherein the second pixel signal comprises a USB display protocol signal.

5. The computing device of claim 1, further comprising a converter device coupled to the physical link, wherein the converter device is to convert the first pixel signal to the second pixel signal, wherein the first pixel signal comprises a display protocol signal and wherein the second pixel signal comprises an I/O protocol of the I/O port.

6. The computing device of claim 5, wherein the display protocol comprises an HDMI protocol, a DisplayPort protocol, a MIPI-DSI protocol, or an MHL protocol.

7. The computing device of claim 1, wherein to compare the first pixel data to the second pixel data comprises to:
- determine whether the first pixel data is correlated with the second pixel data; and
- indicate a display integrity failure in response to a determination that the first pixel data is not correlated with the second pixel data.

8. The computing device of claim 1, wherein to compare the first pixel data to the second pixel data comprises to perform a pixel-by-pixel comparison of the first pixel data and the second pixel data.

9. The computing device of claim 1, wherein to compare the first pixel data to the second pixel data comprises to:
- calculate a first checksum of the first pixel data and a second checksum of the second pixel data; and
- compare the first checksum to the second checksum.

10. The computing device of claim 1, wherein to compare the first pixel data to the second pixel data comprises to:
- infer an expected image based on the first pixel data using a machine learning model; and
- compare the expected image to an image of the second pixel data in response to an inference of the expected image.

11. The computing device of claim 1, wherein the display is to display the image corresponding to the first pixel data based on the first pixel signal in response to the outputting of the first pixel signal.

12. A method for display integrity checking, the method comprising:
- generating, by a computing device, first pixel data indicative of an image, wherein the first pixel data is stored in a data buffer in a memory of the computing device;
- outputting, by the computing device, a first pixel signal from a physical interface of the computing device in response to generating the first pixel data, wherein the first pixel signal is based on the first pixel data, and wherein the physical interface is coupled to a display of the computing device via a physical link;
- receiving, by an I/O port of the computing device, a second pixel signal from a splicer device of the computing device in response to outputting the first pixel signal, wherein the splicer device is coupled to the physical link;
- determining, by the computing device, second pixel data based on the second pixel signal received by the I/O port; and
- comparing, by the computing device, the first pixel data to the second pixel data in response to receiving the second pixel signal.

13. The method of claim 12, wherein receiving the second pixel signal comprises:
- receiving, by the splicer device, the first pixel signal via the physical link; and
- repeating, by the splicer device, the first pixel signal as the second pixel signal in response to receiving the first pixel signal.

14. The method of claim 12, wherein comparing the first pixel data to the second pixel data comprises:
- determining whether the first pixel data is correlated with the second pixel data; and
- indicating a display integrity failure in response to determining that the first pixel data is not correlated with the second pixel data.

15. The method of claim 12, wherein comparing the first pixel data to the second pixel data comprises performing a pixel-by-pixel comparison of the first pixel data and the second pixel data.

16. The method of claim 12, wherein comparing the first pixel data to the second pixel data comprises:
- calculating a first checksum of the first pixel data and a second checksum of the second pixel data; and
- comparing the first checksum to the second checksum.

17. The method of claim 12, wherein comparing the first pixel data to the second pixel data comprises:
- inferring an expected image based on the first pixel data using a machine learning model; and
- comparing the expected image to an image of the second pixel data in response to inferring the expected image.

18. One or more non-transitory, computer-readable storage media comprising a plurality of instructions stored thereon that, in response to being executed, cause a computing device to:
- generate first pixel data indicative of an image, wherein the first pixel data is stored in a data buffer in a memory of the computing device;
- output a first pixel signal from a physical interface of the computing device in response to generating the first pixel data, wherein the first pixel signal is based on the first pixel data, and wherein the physical interface is coupled to a display of the computing device via a physical link;
- receive, by an I/O port of the computing device, a second pixel signal from a splicer device of the computing device in response to outputting the first pixel signal, wherein the splicer device is coupled to the physical link;
- determine second pixel data based on the second pixel signal received by the I/O port; and
- compare the first pixel data to the second pixel data in response to receiving the second pixel signal.

19. The one or more non-transitory, computer-readable storage media of claim 18, wherein to receive the second pixel signal comprises to:
- receive, by the splicer device, the first pixel signal via the physical link; and
- repeat, by the splicer device, the first pixel signal as the second pixel signal in response to receiving the first pixel signal.

20. The one or more non-transitory, computer-readable storage media of claim 18, wherein to compare the first pixel data to the second pixel data comprises to:
- determine whether the first pixel data is correlated with the second pixel data; and
- indicate a display integrity failure in response to determining that the first pixel data is not correlated with the second pixel data.

21. The one or more non-transitory, computer-readable storage media of claim 18, wherein to compare the first pixel data to the second pixel data comprises to perform a pixel-by-pixel comparison of the first pixel data and the second pixel data.

22. The one or more non-transitory, computer-readable storage media of claim 18, wherein to compare the first pixel data to the second pixel data comprises to:

calculate a first checksum of the first pixel data and a second checksum of the second pixel data; and compare the first checksum to the second checksum.

23. The one or more non-transitory, computer-readable storage media of claim 18, wherein to compare the first pixel data to the second pixel data comprises to:

infer an expected image based on the first pixel data using a machine learning model; and compare the expected image to an image of the second pixel data in response to inferring the expected image.

24. A computing device for display integrity checking, the computing device comprising:

a memory;

a display;

an I/O port coupled to the display;

a pixel comparator;

a graphics stack to generate first pixel data indicative of a first image, wherein the first pixel data is stored in a data buffer in a memory of the computing device; and a display controller coupled to the display via a physical link, wherein the display controller is to output the first pixel data to a display of the computing device via a physical link;

wherein the display is to (i) receive the first pixel data via the physical link, (ii) display an image based on the first pixel data in response to receipt of the first pixel data, and (iii) transmit second pixel data to the I/O port in response to display of the image, wherein the second pixel data comprises the first pixel data received by the display;

wherein the I/O port is to receive the second pixel data from the display; and wherein the pixel comparator is to compare the first pixel data to the second pixel data in response to receipt of the second pixel data.

25. The computing device of claim 24, wherein:

the pixel comparator is further to calculate a first checksum of the first pixel data;

the display is further to calculate a second checksum of the second pixel data in response to displaying the second image;

to transmit the second pixel data comprises to transmit the second checksum; and to compare the first pixel data to the second pixel data comprises to compare the first checksum to the second checksum.

* * * * *